United States Patent
Shu et al.

(10) Patent No.: US 12,293,100 B2
(45) Date of Patent: May 6, 2025

(54) DATA WRITING METHOD, DATA READING METHOD, APPARATUS, DEVICE, SYSTEM, AND MEDIUM

(71) Applicants: HUAWEI TECHNOLOGIES CO., LTD., Shenzhen (CN); TSINGHUA UNIVERSITY, Beijing (CN)

(72) Inventors: Jiwu Shu, Beijing (CN); Youyou Lu, Beijing (CN); Jian Gao, Beijing (CN); Xiaodong Tan, Hangzhou (CN); Wenlin Cui, Chengdu (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 18/415,352

(22) Filed: Jan. 17, 2024

(65) Prior Publication Data
US 2024/0152290 A1  May 9, 2024

Related U.S. Application Data

(63) Continuation of application No. PCT/CN2022/078066, filed on Feb. 25, 2022.

(30) Foreign Application Priority Data

Jul. 19, 2021  (CN) .......................... 202110814096.5

(51) Int. Cl.
G06F 3/06  (2006.01)

(52) U.S. Cl.
CPC ............ *G06F 3/064* (2013.01); *G06F 3/0619* (2013.01); *G06F 3/067* (2013.01)

(58) Field of Classification Search
None
See application file for complete search history.

(56) References Cited

FOREIGN PATENT DOCUMENTS

| | | | | |
|---|---|---|---|---|
| CN | 102932331 A | * | 2/2013 | |
| CN | 104270215 B | * | 11/2017 | .......... G06F 11/1004 |

* cited by examiner

*Primary Examiner* — Brian R Peugh
(74) *Attorney, Agent, or Firm* — Leydig, Voit & Mayer, Ltd.

(57) ABSTRACT

This application discloses a data writing method. A network controller performs erasure code encoding on original data, and writes a third quantity of target data blocks of a plurality of obtained target data blocks into a storage node. The network controller reads a first quantity of target data blocks of the third quantity of the target data blocks from the storage node, and decodes the read target data blocks. The plurality of target data blocks include a first quantity of original data blocks and a second quantity of check data blocks, two ends of a target data block include same version information, and the third quantity is greater than the first quantity.

20 Claims, 6 Drawing Sheets

DATA WRITING METHOD, DATA READING METHOD, APPARATUS, DEVICE, SYSTEM, AND MEDIUM

CROSS-REFERENCE TO RELATED APPLICATIONS

This application is a continuation of International Application No. PCT/CN2022/078066, filed on Feb. 25, 2022, which claims priority to Chinese Patent Application No. 202110814096.5 filed on Jul. 19, 2021. The disclosures of the aforementioned applications are hereby incorporated by reference in their entireties.

TECHNICAL FIELD

This application relates to the field of data processing technologies, and in particular, to a data writing method, a data reading method, an apparatus, a device, a system, and a medium.

BACKGROUND

A file is one of the most basic units for data processing. In the big data era, the increasing Internet scale brings increasing file storage requirements. In this case, a single-node file system cannot meet the massive file storage requirements. Therefore, a distributed file system that runs on a cluster formed by a plurality of storage nodes is developed.

In a related technology, a distributed file system often uses an erasure code technology to store data. Generally, during data writing, a central processing unit (CPU) of a client performs erasure code encoding on original data, to obtain an original data block and a check data block, and writes the obtained original data block and the obtained check data block into a storage node. During data reading, the CPU of the client reads the original data block and the check data block from the storage node, and performs erasure code decoding on the read original data block and the read check data block to obtain the original data. Because the client uses the CPU to perform erasure code encoding and erasure code decoding, CPU overheads are increased, and the CPU of the client becomes a system bottleneck of the distributed file system, affecting data processing efficiency.

SUMMARY

This application provides a data writing method, a data reading method, an apparatus, a device, a system, and a medium, to reduce consumption of a central processing unit and improve data processing efficiency.

According to a first aspect, a data writing method is provided. The method includes: A network controller of a first client obtains to-be-written original data; the network controller performs erasure code encoding on the original data, to obtain a plurality of target data blocks; and the network controller writes a third quantity of target data blocks in the plurality of target data blocks into a storage node, where the plurality of target data blocks include a first quantity of original data blocks and a second quantity of check data blocks, two ends of the target data block include same version information, and the third quantity is greater than the first quantity.

According to the data writing method provided in this technical solution, the network controller performs erasure code encoding on the original data, and writes the third quantity of target data blocks in the obtained plurality of target data blocks into the storage node, so that computing overheads originally belonging to a CPU are offloaded to the network controller, thereby reducing consumption of the CPU and improving data processing efficiency. In addition, the two ends of the target data block include the same version information, thereby ensuring data validity.

In a possible implementation, the method further includes: The network controller generates a write success instruction when a first data block is successfully written into the storage node, where the write success instruction is used by a central processing unit of the first client to determine a write result of the first data block, and the first data block is any target data block in the plurality of target data blocks. The CPU is notified of the write result of the first data block by using the write success instruction, to ensure that the first data block is successfully written into the storage node.

In a possible implementation, that the network controller performs erasure code encoding on the original data, to obtain a plurality of target data blocks includes: The network controller obtains the first quantity of original data blocks based on the original data and version information corresponding to the original data, where two ends of the original data block respectively include the version information corresponding to the original data; the network controller performs erasure code encoding on the original data, to obtain check data; and the network controller obtains the second quantity of check data blocks based on the check data and version information corresponding to the check data, where two ends of the check data block respectively include the version information corresponding to the check data. Because the two ends of the original data block include the version information corresponding to the original data, and the two ends of the check data block include the version information corresponding to the check data, it is ensured that the two ends of the data blocks include the same version information, thereby ensuring data validity.

In a possible implementation, the first client has a write lock permission, the write lock permission is a permission to write a target data block into the storage node, and that a network controller of a first client obtains to-be-written original data includes: The network controller obtains the to-be-written original data sent by another client, where the another client is a client that does not have the write lock permission. The network controller of the client that has the write lock permission obtains the original data in the client that does not have the write lock permission, so that the network controller writes the original data into the storage node, thereby reducing a frequency of transferring the write lock permission and improving data writing efficiency.

In a possible implementation, that the network controller performs erasure code encoding on the original data, to obtain a plurality of target data blocks includes: The network controller receives an encoding instruction that is for the original data and sent by the central processing unit of the first client; and the network controller performs erasure code encoding on the original data in response to the encoding instruction, to obtain the plurality of target data blocks.

According to a second aspect, a data reading method is provided. The method includes: A network controller of a second client reads a first quantity of target data blocks from a storage node, where the storage node stores a third quantity of target data blocks in a plurality of target data blocks, the plurality of target data blocks include a first quantity of original data blocks and a second quantity of check data blocks, two ends of the target data block include same version information, and the third quantity is greater than the first quantity; and the network controller performs erasure code decoding on the first quantity of target data blocks, to obtain original data.

According to the data reading method provided in this technical solution, the network controller reads the first quantity of target data blocks in the third quantity of target data blocks, and decodes the read target data blocks, so that computing overheads originally belonging to a CPU are offloaded to the network controller, thereby reducing consumption of the CPU and improving data processing efficiency. In addition, the two ends of the target data block include the same version information, thereby ensuring data validity.

In a possible implementation, that a network controller of a second client reads a first quantity of target data blocks from a storage node includes: The network controller sends a read instruction for a fourth quantity of target data blocks in the third quantity of target data blocks to the storage node, where the fourth quantity is greater than the first quantity, and the fourth quantity is less than or equal to the third quantity; and the network controller receives the first first quantity of target data blocks in the fourth quantity of target data blocks. The read instruction for the target data blocks whose quantity is greater than the first quantity is sent to the storage node, and the first first quantity of target data blocks are received, so that time required for reading data is reduced, and data reading efficiency is improved.

In a possible implementation, that a network controller of a second client reads a first quantity of target data blocks from a storage node includes: The network controller reads, in response to that version information of a second data block is stored in a cache area of the second client, the second data block from the cache area, where the cache area stores a target data block that is historically read by the network controller from the storage node, and the second data block is any target data block in the first quantity of target data blocks; and the network controller reads, in response to that the version information of the second data block is not stored in the cache area, the second data block from the storage node. Because time required for the network controller to read the data block from the cache area is less than time required for reading the data block from the storage node, the second data block is preferentially read from the cache area, so that a read delay of hot data is reduced and data read efficiency is improved.

In a possible implementation, the method further includes: The network controller stores the original data and the first quantity of target data blocks into the cache area. The original data and the target data blocks are stored in the cache area, it is convenient for the network memory to preferentially read the target data blocks from the cache area when subsequently reading the target data blocks, thereby improving data reading efficiency.

In a possible implementation, that the network controller performs erasure code decoding on the first quantity of target data blocks, to obtain original data includes: The network controller obtains a decoding instruction that is based on decoding information and sent by a central processing unit of the second client; and the network controller performs, in response to the decoding instruction, erasure code decoding on the first quantity of target data blocks based on the decoding information, to obtain the original data.

According to a third aspect, a data writing apparatus is provided. The data writing apparatus is used in a network controller, and the apparatus includes: an obtaining module, configured to obtain to-be-written original data; an encoding module, configured to perform erasure code encoding on the original data, to obtain a plurality of target data blocks; and a writing module, configured to write a third quantity of target data blocks in the plurality of target data blocks into a storage node, where the plurality of target data blocks include a first quantity of original data blocks and a second quantity of check data blocks, two ends of the target data block include same version information, and the third quantity is greater than the first quantity.

In a possible implementation, the apparatus further includes: a generation module, configured to generate a write success instruction when a first data block is successfully written into the storage node, where the write success instruction is used by a central processing unit of a first client to determine a write result of the first data block, and the first data block is any target data block in the plurality of target data blocks.

In a possible implementation, the encoding module is configured to obtain the first quantity of original data blocks based on the original data and version information corresponding to the original data, where two ends of the original data block respectively include the version information corresponding to the original data; perform erasure code encoding on the original data, to obtain check data; and obtain the second quantity of check data blocks based on the check data and version information corresponding to the check data, where two ends of the check data block respectively include the version information corresponding to the check data.

In a possible implementation, the first client has a write lock permission, the write lock permission is a permission to write a target data block into the storage node, and the obtaining module is configured to obtain the to-be-written original data sent by another client, where the another client is a client that does not have the write lock permission.

In a possible implementation, the encoding module is configured to: receive an encoding instruction that is for the original data and sent by the central processing unit of the first client; and perform erasure code encoding on the original data in response to the encoding instruction, to obtain the plurality of target data blocks.

According to a fourth aspect, a data reading apparatus is provided. The data reading apparatus is used in a network controller, and the apparatus includes: a reading module, configured to read a first quantity of target data blocks from a storage node, where the storage node stores a third quantity of target data blocks in a plurality of target data blocks, the plurality of target data blocks include a first quantity of original data blocks and a second quantity of check data blocks, two ends of the target data block include same version information, and the third quantity is greater than the first quantity; and a decoding module, configured to perform erasure code decoding on the first quantity of target data blocks, to obtain original data.

In a possible implementation, the reading module is configured to: send a read instruction for a fourth quantity of target data blocks in the third quantity of target data blocks to the storage node, where the fourth quantity is greater than the first quantity, and the fourth quantity is less than or equal to the third quantity; and receive the first first quantity of target data blocks in the fourth quantity of target data blocks.

In a possible implementation, the reading module is configured to: read, in response to that version information of a second data block is stored in a cache area of a second client, the second data block from the cache area, where the cache area stores a target data block that is historically read by the network controller from the storage node, and the second data block is any target data block in the first quantity of target data blocks; and read, in response to that the version information of the second data block is not stored in the cache area, the second data block from the storage node.

In a possible implementation, the apparatus further includes: a storage module, configured to store the original data and the first quantity of target data blocks into the cache area.

In a possible implementation, the decoding module is configured to: obtain a decoding instruction that is based on decoding information and sent by a central processing unit of the second client; and perform, in response to the decoding instruction, erasure code decoding on the first quantity of target data blocks based on the decoding information, to obtain the original data.

According to a fifth aspect, a network device is provided, including a processor, where the processor is coupled to a memory, the memory stores at least one program instruction or code, and the at least one program instruction or code is loaded and executed by the processor, so that the network device implements the data writing method according to any one of the first aspect or the data reading method according to any one of the second aspect.

According to a sixth aspect, a computer-readable storage medium is provided, storing a computer program, where when the computer program is executed by a computer, the data writing method according to any one of the first aspect or the data reading method according to any one of the second aspect is implemented.

According to a seventh aspect, a computer program product is provided, including a computer program. When the computer program is executed by a computer, the data writing method according to any one of the first aspect or the data reading method according to any one of the second aspect is implemented.

According to an eighth aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the data writing method according to any one of the first aspect or the data reading method according to any one of the second aspect.

Optionally, there are one or more processors, and there are one or more memories.

Optionally, the memory and the processor may be integrated together, or the memory and the processor may be separately disposed.

In an optional implementation process, the memory may be a read-only memory (ROM). The memory and the processor may be integrated into one chip, or may be separately disposed in different chips. A type of the memory and a manner in which the memory and the processor are disposed are not limited in embodiments of this application.

According to a ninth aspect, a chip is provided, including a processor configured to invoke, from a memory, and run instructions stored in the memory, so that a communication device in which the chip is installed performs the data writing method according to any one of the first aspect or the data reading method according to any one of the second aspect.

According to a tenth aspect, another chip is provided, including an input interface, an output interface, a processor, and a memory, where the input interface, the output interface, the processor, and the memory are connected through an internal connection path, the processor is configured to execute code in the memory, and when the code is executed, the processor is configured to perform the data writing method according to any one of the first aspect or the data reading method according to any one of the second aspect.

According to an eleventh aspect, a data processing system is provided, where the system includes a network controller, and the network controller is configured to perform the data writing method according to any one of the first aspect or the data reading method according to any one of the second aspect.

DESCRIPTION OF EMBODIMENTS

The following further describes implementations of this application in detail with reference to the accompanying drawings.

A distributed file system (DFS) can distribute a large amount of data to different storage nodes for storage, reducing the risk of data loss. In the DFS, an erasure code technology is often used to process data. In embodiments of this application, a network controller performs erasure code encoding on original data, and writes a third quantity of target data blocks in a plurality of obtained target data blocks into a storage node; or the network controller reads a first quantity of target data blocks in the third quantity of target data blocks, and decodes the read target data blocks. In embodiments of this application, computing overheads originally belonging to a CPU are offloaded to the network controller, thereby reducing consumption of the CPU and improving data processing efficiency. In addition, two ends of the target data block include same version information, thereby ensuring data validity.

Figure 1:
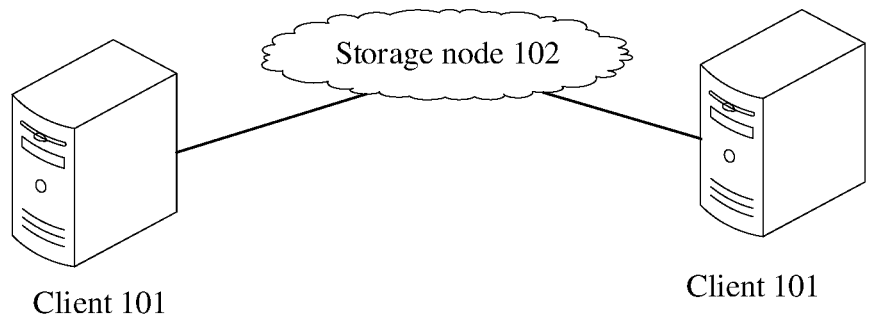
FIG. 1 is a schematic diagram of an implementation environment of a data processing method according to an embodiment of this application.

FIG. 1 is a schematic diagram of an implementation environment of a data processing method according to an embodiment of this application. The implementation environment includes clients 101 and a storage node 102, and the data processing method includes a data writing method and a data reading method.

There are a plurality of clients 101. FIG. 1 shows only two clients 101. The client 101 includes but is not limited to a desktop computer, a notebook computer, a tablet computer, and the like. The client 101 is equipped with a network controller. The client 101 controls, by using a primitive, the network controller to perform erasure code encoding on original data, to obtain a plurality of target data blocks (where in this embodiment of this application and the following embodiments, the plurality of target data blocks may be collectively referred to as an erasure code strip), and writes some target data blocks or all the target data blocks in the plurality of target data blocks into the storage node 102. The client 101 further controls, by using the primitive, the network controller to read some target data blocks or all the target data blocks from the storage node 102, and performs erasure code decoding on the read target data blocks, to obtain the original data.

The network controller is also referred to as a network adapter, and is computer hardware designed to allow a computer to communicate on a computer network. Generally, a processor and a memory are installed on the network controller. The processor is configured to process data, and the memory is configured to store data. The network controller is not limited in embodiments of this application.

In a possible implementation, the network controller is a remote direct memory access network interface controller (RNIC). The RNIC is short for remote direct memory access (RDMA) network adapter. The RNIC is a network controller that supports an infiniband technology and an RDMA primitive, and is a physical hardware basis of RDMA. Some RNICs can also be used for near-data computing, improving performance of a distributed system.

RDMA is a technology in which a memory of another computer is remotely accessed by using a network without participation of an operating system at any end, and is one of direct memory access technologies. RDMA has a plurality of different implementations. One implementation is based on an infiniband interconnection technology, and can provide extremely high RDMA bandwidth and extremely low memory access delay.

It should be noted that the storage node 102 may be one storage node, or may be a storage node cluster including at least two storage nodes, and one storage node corresponds to at least one memory.

In a possible implementation, the memory is a non-volatile random access memory (NVRAM) referred to as a non-volatile memory or persistent main memory (PMM) for short, and is a type of memory that supports random access and that can still retain data in the memory after a power failure. In this embodiment of this application and another embodiment, a storage node cluster whose memory is an NVRAM is also referred to as an NVRAM cluster.

Figure 2:
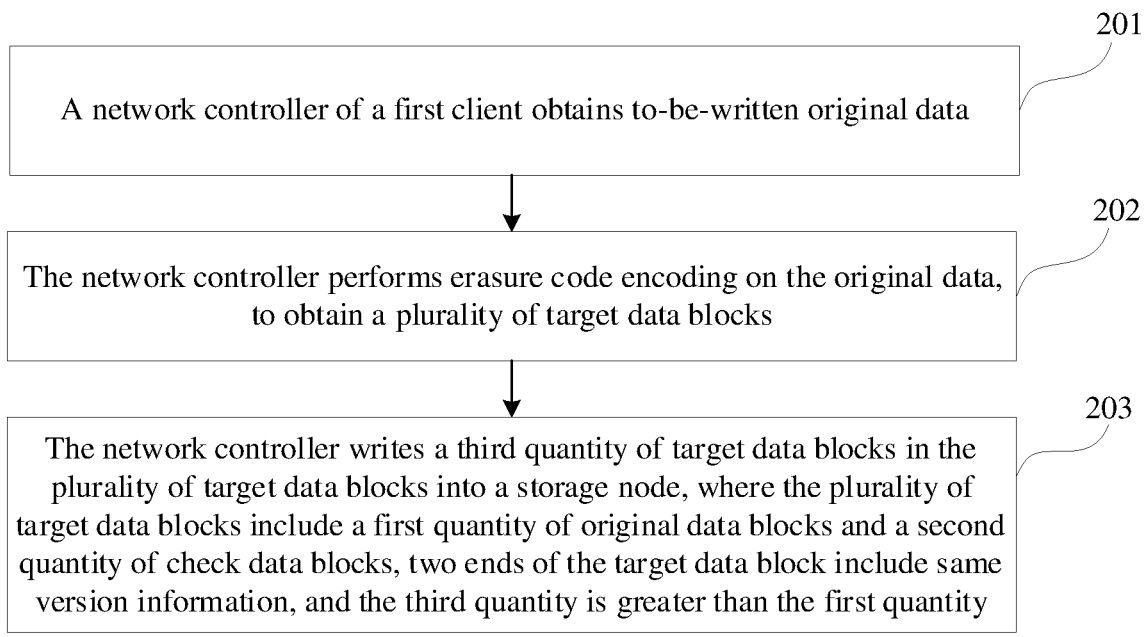
FIG. 2 is a flowchart of a data writing method according to an embodiment of this application.

Based on the implementation environment shown in FIG. 1, an embodiment of this application provides a data writing method. FIG. 2 is a flowchart of a data writing method according to an embodiment of this application. The method is performed by a network controller in a first client. The first client is a client 101 shown in FIG. 1. The method includes step 201 to step 203.

Step 201: The network controller of the first client obtains to-be-written original data.

The first client uses data generated by the first client or data received from another client as the to-be-written original data, and sends the original data to the network controller, so that the network controller performs erasure code encoding on the original data.

In a possible implementation, the first client has a write lock permission, the write lock permission is a permission to write a target data block into a storage node, and that the network controller of the first client obtains to-be-written original data includes: The network controller obtains the to-be-written original data sent by another client, where the another client is a client that does not have the write lock permission.

In this embodiment of this application, when the client that does not have the write lock permission needs to write the original data into the storage node, the client that does not have the write lock permission needs to send the original data to the client that has the write lock permission, and the network controller of the client that has the write lock permission writes the original data into the storage node, thereby reducing a frequency of transferring the write lock permission and improving data writing efficiency.

Step 202: The network controller performs erasure code encoding on the original data, to obtain a plurality of target data blocks.

When performing erasure code encoding on the original data, the network controller may perform erasure code encoding on the original data by using a Reed-Solomon code (RS Code) technology. The RS code technology is a common erasure code encoding technology, and uses a composite matrix of a unit matrix and a Coxie matrix as an encoding matrix, so that an inverse matrix of an encoding matrix submatrix can be obtained by using time that is directly proportional to a quantity of matrix elements.

When the RS code technology is used to perform erasure code encoding on the original data, the obtained plurality of target data blocks include a first quantity of original data blocks and a second quantity of check data blocks. If the first quantity is denoted as k, and the second quantity is denoted as m, an erasure code encoding policy may be denoted as an RS (k, m) policy. In other words, the RS (k, m) policy is used to perform erasure code encoding on the original data, to obtain k original data blocks and m check data blocks, where k and m are both positive integers.

In this embodiment of this application, that the network controller performs erasure code encoding on the original data, to obtain a plurality of target data blocks includes: The network controller receives an encoding instruction that is for the original data and sent by the central processing unit of the first client; and the network controller performs erasure code encoding on the original data in response to the encoding instruction, to obtain the plurality of target data blocks.

When erasure code encoding needs to be performed on the original data, the CPU sends an erasure code encoding instruction for the original data to the network controller, and the network controller performs, in response to the erasure code encoding instruction, erasure code encoding on the original data by using the RS (k, m) policy, to obtain the plurality of target data blocks.

That the network controller performs erasure code encoding on the original data, to obtain a plurality of target data blocks includes: The network controller obtains the first quantity of original data blocks based on the original data and version information corresponding to the original data, where two ends of the original data block respectively include the version information corresponding to the original data; the network controller performs erasure code encoding on the original data, to obtain check data; and the network controller obtains the second quantity of check data blocks based on the check data and version information corresponding to the check data, where two ends of the check data block respectively include the version information corresponding to the check data.

When performing erasure code encoding on the original data by using the RS (k, m) policy, the network controller first segments the original data, to obtain k pieces of original data obtained through segmentation. In one aspect, for each piece of original data obtained through segmentation, an original data block corresponding to the original data obtained through segmentation is obtained based on the original data obtained through segmentation and version information corresponding to the original data obtained through segmentation. In another aspect, erasure code encoding is performed on the k pieces of original data obtained through segmentation by using an RS (k, m) encoding matrix to obtain m pieces of check data. For each piece of check data, a check data block corresponding to the check data is obtained based on the check data and version information corresponding to the check data.

The RS (k, m) encoding matrix is generated by the CPU of the first client according to an RS Code encoding rule, and the CPU stores the RS (k, m) encoding matrix into the network controller. When the network controller is an RNIC, the CPU stores the RS (k, m) encoding matrix into the RNIC by using an RDMA primitive.

The version information is generated by the CPU of the first client. Optionally, for each piece of data (original data obtained through segmentation or check data), the CPU prepares a piece of memory with version information at two ends, sets an area used for the data as an intermediate area (namely, an area between the version information at the two ends) of the memory, and sets an area used when the data is written into the storage node as an entire memory area. The CPU sends an erasure code encoding request to the network controller, and the network controller performs erasure code encoding on the original data, and writes data (original data obtained through segmentation or check data) obtained through encoding into an intermediate area of a memory that carries version information corresponding to the data, to obtain a target data block (an original data block or a check data block) corresponding to the data.

Step 203: The network controller writes a third quantity of target data blocks in the plurality of target data blocks into a storage node, where the plurality of target data blocks include a first quantity of original data blocks and a second quantity of check data blocks, two ends of the target data block include same version information, and the third quantity is greater than the first quantity.

The CPU sends a write request to the network controller, and the network controller writes the third quantity of target data blocks into the storage node in response to the write request. The network controller may write the third quantity of target data blocks into a same storage node, or may respectively write the third quantity of target data blocks into different storage nodes; or may write some target data blocks in the third quantity of target data blocks into a same storage node, and write the other target data blocks into different storage nodes.

In this embodiment of this application, the network controller only needs to write the third quantity of target data blocks in the plurality of target data blocks into the storage node, and it is considered that a data write operation succeeds. For example, erasure code encoding is performed on the original data by using an RS (2, 2) policy, and an obtained erasure code strip includes four target data blocks, which are two original data blocks and two check data blocks respectively. It is considered that the write operation succeeds as long as three or four of the four target data blocks are written into the storage node.

It should be noted that, that the third quantity in this embodiment of this application is greater than the first quantity includes that the third quantity is equal to a sum of the first quantity and the second quantity. In this case, the network controller writes all target data blocks obtained through erasure code encoding into the storage node. For example, the RS (2, 2) policy is used to perform erasure code encoding on the original data, and the obtained two original data blocks and two check data blocks are all written into the storage node.

In a possible implementation, some storage nodes have a large tail delay. For example, the storage node is an NVRAM, and medium wear control is performed inside the NVRAM. As a result, a write delay of the NVRAM occasionally increases by about 100 times, and the tail delay is large. The third quantity of target data blocks are written into the storage node, so that the tail delay of the storage node can be reduced, and data writing efficiency can be improved.

The data writing method further includes: The network controller generates a write success instruction when a first data block is successfully written into the storage node, where the write success instruction is used by a central processing unit of the first client to determine a write result of the first data block, and the first data block is any target data block in the plurality of target data blocks. This step is performed after step 203.

In this embodiment of this application, the write delay is reduced by polling the network controller by the CPU. Optionally, each time the network controller writes a target data block (namely, a first data block) into the storage node, the network controller or the storage node generates a write success instruction corresponding to the target data block, and the CPU obtains the write success instruction every target duration, to obtain a write result of the target data block. When a quantity of write success instructions obtained by the CPU is greater than or equal to the third quantity, the CPU stops the polling operation, that is, the CPU no longer obtains the write success instruction every target duration. In this case, it is considered that the write operation succeeds.

An optional value of the target duration is not limited. For example, the target duration is duration data at a nanosecond level, a microsecond level, or a millisecond level.

In a possible implementation, when the network controller writes, into the storage node, the plurality of target data blocks obtained through erasure code encoding, the network controller sends a write operation complete message to the CPU. When the CPU receives the write operation complete message, it indicates that the network controller successfully writes all the target data blocks into the storage node.

According to the data writing method provided in this technical solution, the network controller performs erasure code encoding on the original data, and writes the third quantity of target data blocks in the obtained plurality of target data blocks into the storage node, so that computing overheads originally belonging to a CPU are offloaded to the network controller, thereby reducing consumption of the CPU and improving data processing efficiency. In addition, the two ends of the target data block include the same version information, thereby ensuring data validity.

Figure 3:
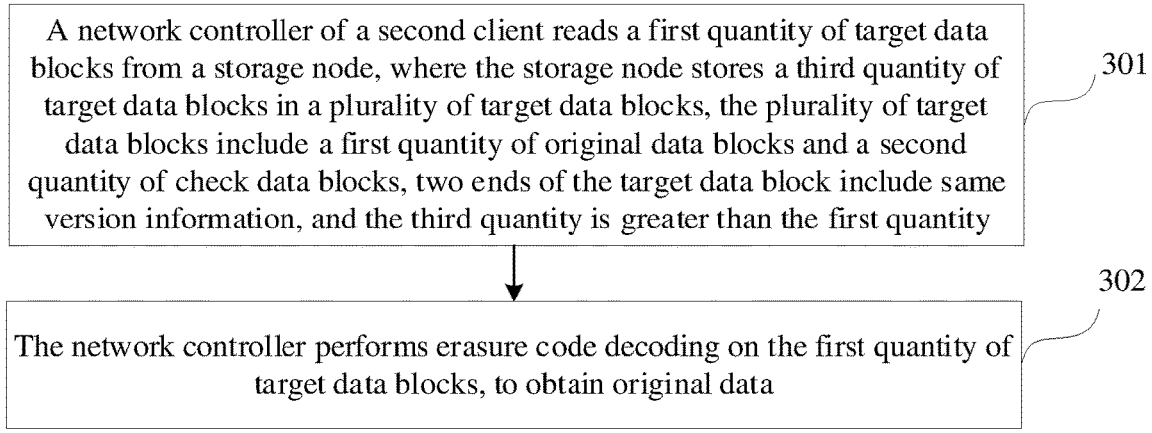
FIG. 3 is a flowchart of a data reading method according to an embodiment of this application.

Based on the implementation environment shown in FIG. 1, an embodiment of this application provides a data reading method. FIG. 3 is a flowchart of a data reading method according to an embodiment of this application. The method is performed by a network controller in a second client, the second client is a client 101 shown in FIG. 1, and the method includes step 301 and step 302.

Step 301: The network controller of the second client reads a first quantity of target data blocks from a storage node, where the storage node stores a third quantity of target data blocks in a plurality of target data blocks, the plurality of target data blocks include a first quantity of original data blocks and a second quantity of check data blocks, two ends of the target data block include same version information, and the third quantity is greater than the first quantity.

In this embodiment of this application, the second client and the first client are a same client or different clients. The second client is equipped with a network controller, and the second client controls, by using a primitive, the network controller to read the first quantity of target data blocks from the storage node. The storage node stores the third quantity of target data blocks in the plurality of target data blocks. For related descriptions, refer to the foregoing embodiments of the data writing method. Details are not described herein again.

That the network controller of the second client reads a first quantity of target data blocks from a storage node includes: The network controller sends a read instruction for a fourth quantity of target data blocks in the third quantity of target data blocks to the storage node, where the fourth quantity is greater than the first quantity, and the fourth quantity is less than or equal to the third quantity; and the network controller receives the first first quantity of target data blocks in the fourth quantity of target data blocks.

To reduce the tail delay, the network controller sends a read instruction for a fourth quantity of target data blocks in the third quantity of target data blocks to the storage node, and the network controller receives a wait instruction sent by a CPU of the second client. The wait instruction is for monitoring a quantity of target data blocks sent by the storage node to the network controller. When the network controller receives the first first quantity of target data blocks in the fourth quantity of target data blocks, it is detected, by using the wait instruction, that the network controller receives the first quantity of target data blocks, and a message indicating that the network controller receives the first quantity of target data blocks is sent to the CPU of the second client.

To ensure data validity, when receiving any target data block, the network controller first detects whether version information at two ends of the target data block is the same. When the version information at the two ends of the target data block is the same, it indicates that the target data block is a valid data block. In this case, it is detected, by using the wait instruction, that that the network controller receives a target data block. When the version information at the two ends of the target data block is different, it indicates that the target data block is an invalid data block. In this case, the network controller filters out the invalid data block, and it is detected, by using the wait instruction, that the network controller does not receive the target data block.

In this embodiment of this application, that the network controller of the second client reads a first quantity of target data blocks from a storage node includes: The network controller reads, in response to that version information of a second data block is stored in a cache area of the second client, the second data block from the cache area, where the cache area stores a target data block that is historically read by the network controller from the storage node, and the second data block is any target data block in the first quantity of target data blocks; and the network controller reads, in response to that the version information of the second data block is not stored in the cache area, the second data block from the storage node.

When reading the target data block from the storage node, the network controller stores the target data block in the cache area. In this manner, the cache area stores the target data block that is historically read by the network controller. When the network controller needs to read the first quantity of target data blocks, for any target data block (namely, the second data block) in the first quantity of target data blocks, when version information of the target data block is stored in the cache area, the network controller reads the target data block from the cache area; or when version information of the target data block is not stored in the cache area, the network controller reads the target data block from the storage node.

The target data block is preferentially read from the cache area, and the target data block is read from the storage node, so that a read delay of hot data is reduced, and efficiency is ensured.

Step 302: The network controller performs erasure code decoding on the first quantity of target data blocks to obtain original data.

When the CPU of the second client receives the message indicating that the network controller receives the first quantity of target data blocks, the CPU controls, by using the primitive, the network controller to perform erasure code decoding on the first quantity of target data blocks, to obtain the original data.

That the network controller performs erasure code decoding on the first quantity of target data blocks, to obtain original data includes: The network controller obtains a decoding instruction that is based on decoding information and sent by a central processing unit of the second client; and the network controller performs, in response to the decoding instruction, erasure code decoding on the first quantity of target data blocks based on the decoding information, to obtain the original data.

The CPU of the second client generates an encoding matrix based on an RS (k, m) policy, and stores the encoding matrix into the network controller by using a primitive. For each first quantity of submatrices in the encoding matrix, the CPU of the second client calculates an inverse matrix of the first quantity of submatrices, and uses the calculated inverse matrix as a decoding matrix. In other words, the CPU obtains a plurality of decoding matrices based on the encoding matrix. The CPU uses the primitive to store the plurality of decoding matrices into the network controller.

When receiving the message indicating that the network controller receives the first quantity of target data blocks, the CPU of the second client determines a corresponding decoding matrix based on the first quantity of target data blocks, and sends a decoding instruction based on the decoding matrix to the network controller. In response to the decoding instruction, the network controller performs erasure code decoding on the first quantity of target data blocks by using the decoding matrix, to obtain the original data.

In a possible implementation, the method further includes: The network controller stores the original data and the first quantity of target data blocks into the cache area. This step is performed after step 302.

The network controller stores the original data and the first quantity of target data blocks into the cache area, so that the target data blocks are preferentially read from the cache area when being read subsequently. When all the target data blocks that need to be read are stored in the cache area, the original data is directly obtained from the cache area, thereby improving efficiency of data reading and data decoding, reducing the read delay of hot data, and improving efficiency of data reading.

According to the data reading method provided in this technical solution, the network controller reads the first quantity of target data blocks in the third quantity of target data blocks, and decodes the read target data blocks, so that computing overheads originally belonging to a CPU are offloaded to the network controller, thereby reducing consumption of the CPU and improving data processing efficiency. In addition, the two ends of the target data block include the same version information, thereby ensuring data validity.

In this embodiment of this application and another embodiment, the data writing method and the data reading method may be collectively referred to as a data processing method. The data processing method in embodiments of this application may be implemented based on a distributed storage system. The distributed storage system is formed by a storage node cluster and several clients. The clients may write data into the storage node cluster or read data from the storage node cluster. The storage node described above is the storage node cluster in this embodiment of this application.

The storage node cluster persistently stores the third quantity of target data blocks in the plurality of target data blocks obtained by performing erasure code encoding on the original data. The client includes a host (namely, a CPU) and a network controller. The host offloads a computing task related to erasure code encoding to the network controller, and initializes an encoding matrix and a decoding matrix that are stored into the network controller.

Figure 4:
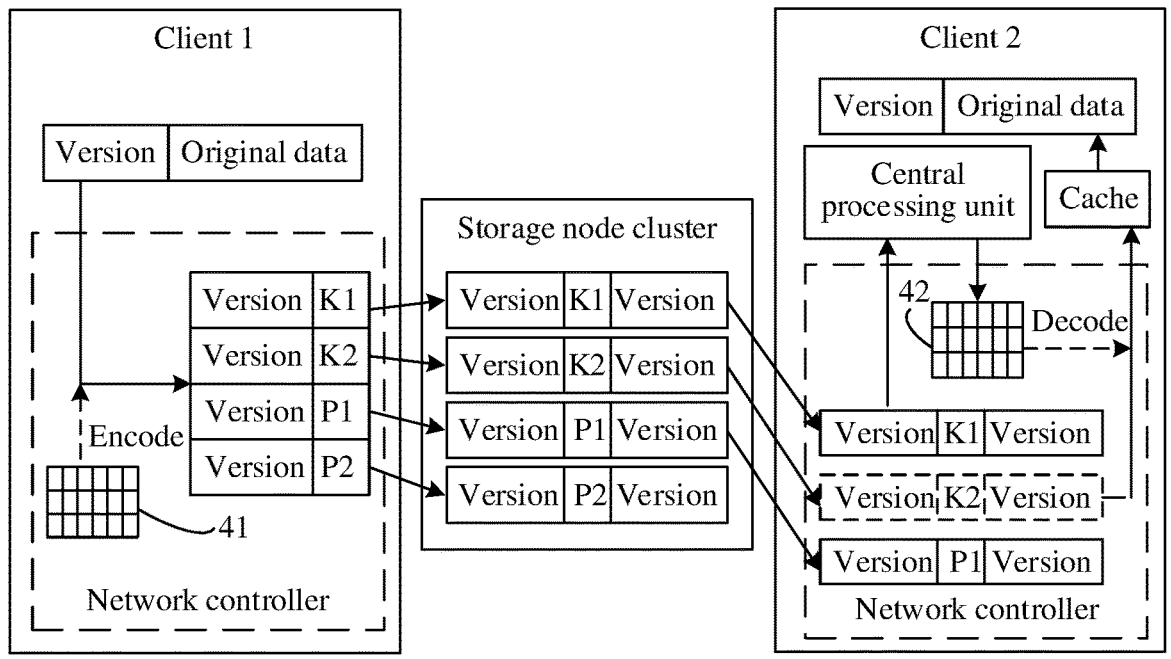
FIG. 4 is an architectural diagram of a distributed storage system according to an embodiment of this application.

Next, FIG. 4 is an architectural diagram of a distributed storage system according to an embodiment of this application. The distributed storage system includes a client 1, a storage node cluster, and a client 2. The client 1 corresponds to the first client described above, and the client 2 corresponds to the second client described above.

This embodiment of this application is described in detail by using an example in which a network controller is an RNIC, the storage node cluster is an NVRAM cluster, and an RS (2, 2) policy is used to perform erasure code encoding on the original data. To be specific, RS (k, m) described above is RS (2, 2).

The client 1 first generates an RS (2, 2) encoding matrix according to an RS Code encoding rule, and caches the RS (2, 2) encoding matrix into the network controller RNIC by using an RDMA primitive, where information indicated by a number 41 in FIG. 4 is the RS (2, 2) encoding matrix. When the client 1 needs to write the original data into the storage node cluster, the client 1 indicates, by using the RDMA primitive, the network controller RNIC to perform erasure code encoding processing on the original data based on a storage area including the original data and a version (namely, the version information described above) corresponding to the original data.

When the RNIC performs erasure code encoding processing on the original data, the RNIC first determines, based on the version corresponding to the original data, a storage area corresponding to the original data, and extracts the original data from the storage area. In one aspect, the original data is segmented into two segments of data, denoted as K1 and K2. K1 is written into the storage area of the RNIC, to obtain a storage area (namely, an original data block of K1) including K1 and a version corresponding to K1, and K2 is written into the storage area of the RNIC, to obtain a storage area (namely, an original data block of K2) including K2 and a version corresponding to K2. In another aspect, erasure code encoding processing is performed based on K1, K2, and the RS (2, 2) encoding matrix indicated by the number 41, to obtain check data, which is denoted as P1 and P2 respectively. P1 is written into the storage area of the RNIC, to obtain a storage area (namely, a check data block of P1) including P1 and a version corresponding to P1, and P2 is written into the storage area of the RNIC, to obtain a storage area (namely, a check data block of P2) including P2 and a version corresponding to P2.

It may be understood that storage areas corresponding to K1, K2, P1, and P2 may further include other information. For example, the storage area may further include write lock information added by using a node number of the client 1. During actual implementation, versions corresponding to K1, K2, P1, and P2 are version numbers, a version number corresponding to K1 is less than a version number corresponding to K2, the version number corresponding to K2 is less than a version number corresponding to P1, and the version number corresponding to P1 is less than a version number corresponding to P2. The RNIC only performs erasure code encoding on the original data and does not process the version corresponding to the original data.

It should be noted that the storage areas shown in the RNIC of the client 1 in FIG. 4 shows only the data (K1, K2, P1, P2) included in the storage areas and the versions corresponding to the data. Actually, a storage area includes a version corresponding to data at the head, a version corresponding to the data at the tail, and the data between the two versions.

After the RNIC obtains the storage areas respectively corresponding to K1, K2, P1, and P2, by using a read/write feature of the RNIC from left to right, a low address is first read and written, and then a high address is read and written. In this way, when data in the storage area of the RNIC is written into the storage node cluster, two ends of the storage area of the storage node cluster include a same version, denoted as a version at the head and a version at the tail. In other words, when the RNIC writes the version corresponding to K1 and K1 included in the storage area corresponding to K1 into the storage node cluster, the storage area corresponding to K1 in the storage node cluster includes the version corresponding to K1 at the head, the version corresponding to K1 at the tail, and K1 between the two versions. Based on the same principle, the storage area corresponding to K2 in the storage node cluster includes the version corresponding to K2 at the head, the version corresponding to K2 at the tail, and K2 between the two versions; the storage area corresponding to P1 in the storage node cluster includes the version corresponding to P1 at the head, the version corresponding to P1 at the tail, and P1 between the two versions; and the storage area corresponding to P2 in the storage node cluster includes the version corresponding to P2 at the head, the version corresponding to P2 at the tail, and P2 between the two versions.

The validity of the data between the two versions is ensured by using the version at the head and the version at the tail. When the version at the head is the same as the version at the tail, it indicates that the data between the two versions is valid; or when the version at the head is different from the version at the tail, it indicates that the data between the two versions is invalid.

In a possible implementation, the write lock information occupies two bytes (namely, 16-bit write lock information), and the version occupies six bytes (namely, 48-bit version number). In other words, the storage area of the RNIC includes an 8-byte area used to store the write lock information and the version. The storage area in the storage node cluster includes an 8-byte area (used to store the write lock information and the version) at the head and an 8-byte area (also used to store the write lock information and the version) at the tail, and the version at the head is the same as the version at the tail.

Because the network controller of the client 1 may write an erasure code strip corresponding to the original data into the storage node cluster, the client 1 has the write lock permission. When another client needs to write a piece of original data into the storage node cluster, the another client needs to send the original data to the client 1, so that the network controller of the client 1 performs erasure code encoding processing on the original data, and writes an obtained erasure code strip into the storage node cluster.

When the RNIC of the client 1 writes the erasure code strip into the storage node cluster, the host of the client 1 polls a quantity of write success instructions by using an RDMA primitive. The write success instruction is generated by the RNIC when the RNIC successfully writes the storage area of the RNIC into the storage node cluster. In other words, when the RNIC writes the storage area corresponding to K1, a write success instruction corresponding to K1 is generated; when the RNIC writes the storage area corresponding to K2, a write success instruction corresponding to K2 is generated; when the RNIC writes the storage area corresponding to P1, a write success instruction corresponding to P1 is generated; and when the RNIC writes the storage area corresponding to P2, a write success instruction corresponding to P2 is generated.

When the quantity of write success instructions obtained by the host of the client 1 through polling is 3, it indicates that the write operation of the erasure code strip corresponding to the original data succeeds. In this case, the client 1 may continue to poll the quantity of write success instructions until the quantity of write success instructions is 4; or the client 1 may stop polling the quantity of write success instructions, and the RNIC asynchronously sends a write complete instruction to the host, where the write complete instruction is generated when storage areas corresponding to K1, K2, P1, and P2 are all written into the storage node cluster. The storage areas corresponding to K1, K2, P1, and P2 are respectively written into different storage nodes in the storage node cluster.

The client 2 first generates an RS (2, 2) encoding matrix according to an RS Code encoding rule, and caches the RS (2, 2) encoding matrix into the network controller RNIC by using an RDMA primitive. The client 2 enumerates each second-order submatrix in the RS (2, 2) encoding matrix, calculates an inverse matrix of each second-order submatrix to obtain a decoding matrix, and stores each decoding matrix into the RNIC of the client 2 by using an RDMA primitive, where information indicated by a number 42 in FIG. 4 is a decoding matrix.

When the client 2 attempts to read the target data blocks from the storage node cluster, the client 2 sends an RDMA read primitive for three target data blocks to the storage node cluster. The client 2 submits a wait primitive to the RNIC simultaneously, to monitor, by using the wait primitive, a quantity of read primitives that are successfully returned, where the read primitive is generated when the RNIC receives the target data blocks. When a quantity of read primitives is 2, the wait primitive is used to notify the central processing unit CPU, and the CPU determines, based on a source of the target data blocks, a decoding matrix that needs to be used, and then immediately uses the RDMA primitive to indicate the RNIC to perform erasure code decoding by using the decoding matrix, and write original data obtained by decoding into the cache.

As shown in FIG. 4, the client 2 sends the RDMA read primitive to three different storage nodes NVRAMs, to read the storage area corresponding to K1, the storage area corresponding to K2, and the storage area corresponding to P1. Because the storage node corresponding to K2 has a delay, the RNIC first receives the storage area corresponding to K1 and the storage area corresponding to P1, and then receives the storage area corresponding to K2. When the RNIC first receives the storage area corresponding to K1 and the storage area corresponding to P1, the CPU determines a corresponding decoding matrix based on the storage area corresponding to K1 and the storage area corresponding to P1. The RNIC performs erasure code decoding processing based on the decoding matrix, the storage area corresponding to K1, and the storage area corresponding to P1, to obtain original data, and stores the original data into the cache, where the storage area corresponding to the original data includes the original storage and a version corresponding to the original data.

A storage area in the storage node cluster includes a version at the head, a version at the tail, and data between the two versions. Therefore, when the RNIC receives the storage area corresponding to K1 and the storage area corresponding to P1, and after the wait primitive is used to notify the CPU, the CPU first checks whether the version corresponding to K1 at the head in the storage area corresponding to K1 is the same as the version corresponding to K1 at the tail. If the two versions are the same, the CPU determines that the storage area corresponding to K1 is a valid target data block; or if the two versions are different, the CPU determines that the storage area corresponding to K1 is an invalid target data block. Similarly, the CPU also needs to check whether the version corresponding to P1 at the head in the storage area corresponding to P1 is the same as the version corresponding to P1 at the tail, to determine whether the storage area corresponding to P1 is a valid target data block.

When both storage areas corresponding to K1 and P1 are valid target data blocks, the RNIC performs erasure code decoding by using the storage areas corresponding to K1 and P1, to obtain original data. When one of the storage areas corresponding to K1 and P1 is a valid target data block, the RNIC receives the storage area corresponding to K2, and the CPU determines that the storage area corresponding to K2 is a valid target data block, the RNIC performs erasure code decoding by using the storage area corresponding to K2 and the valid target data block in the storage areas corresponding to K1 and P1. When the storage areas corresponding to K1 and P1 are both invalid target data blocks, the RNIC reads the storage areas corresponding to K2 and P2 from the storage node cluster, and the CPU determines that the storage areas corresponding to K2 and P2 are both valid target data blocks, the RNIC performs erasure code decoding by using the storage area corresponding to K2 and the storage area corresponding to P2.

Whether the data is valid is determined by checking whether the version at the head is consistent with the version at the tail in the storage area corresponding to the data, to perform erasure code decoding by using the valid data.

Because the version has a small quantity of bytes, data transmission overheads in this process are very small.

In this embodiment of this application, the cache of the client 2 further stores a storage area of data historically read by the RNIC. The storage area corresponding to K1 is used as an example. When the client 2 needs to read the storage area corresponding to K1, the RNIC first searches the cache for the version of K1. If the version of K1 exists in the cache, the RNIC reads the storage area corresponding to K1 from the cache. If the version of K1 does not exist in the cache, the RNIC reads the storage area corresponding to K1 from the storage node cluster. A manner of reading a storage area corresponding to other data is similar to the manner of reading the storage area corresponding to K1, and details are not described herein again.

Because time for reading data from the cache is less than time for reading data from the storage node cluster, a storage area corresponding to the data is preferentially read from the cache, thereby reducing a read delay of hot data and improving data read efficiency.

Figure 5:
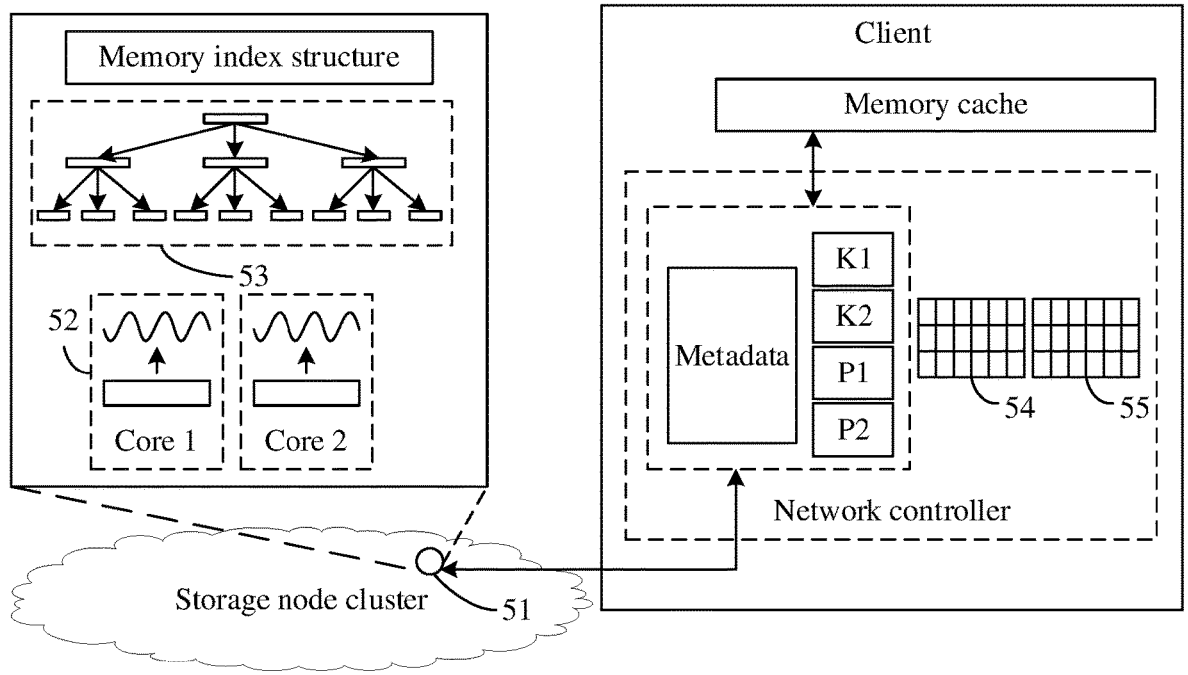
FIG. 5 is an architectural diagram of another distributed storage system according to an embodiment of this application.

Next, FIG. 5 is an architectural diagram of another distributed storage system according to an embodiment of this application. This embodiment of this application is described in detail by using an example in which a network controller is an RNIC, the storage node cluster is an NVRAM cluster, and an RS (2, 2) policy is used to perform erasure code encoding on the original data. To be specific, RS (k, m) described above is RS (2, 2).

The NVRAM cluster monitors, by using an RDMA primitive, a write operation of writing target data blocks into the NVRAM by the RNIC, and asynchronously updates a memory index structure in the NVRAM memory. In this embodiment of this application, the memory is a dynamic random access memory (DRAM).

Information indicated by a number 51 in FIG. 5 is an NVRAM. After the RNIC of the client writes the target data blocks into the NVRAM 51, a memory index structure of the NVRAM 51 is updated. The storage node cluster divides NVRAM space for storing the target data blocks into several segments, and for each segment, a separate core is responsible for monitoring and updating metadata. For example, information indicated by a number 52 in FIG. 5 indicates that a core 1 is responsible for monitoring and updating metadata corresponding to a segment, and the core 2 is responsible for monitoring and updating metadata corresponding to another segment. Information indicated by a number 53 represents a memory index structure.

When the client needs to write the target data blocks into the storage node cluster, the client first sends a remote process call to the NVRAM 51 in the storage node cluster, to obtain metadata. The metadata is also referred to as mediation data or relay data, and the metadata is data that describes data. Generally, metadata is mainly information that describes data attributes, and is used to support functions such as storage location, historical data, resource search, and file recording. In this embodiment of this application, the metadata indicates a storage location of the target data blocks in the storage node cluster.

The client sends the original data and the metadata to the RNIC, and writes the original data and the metadata into a memory cache simultaneously. The client first generates an RS (2, 2) encoding matrix, and caches the RS (2, 2) encoding matrix into the RNIC, where information indicated by a number 54 in FIG. 5 is the RS (2, 2) encoding matrix. The client enumerates each second-order submatrix in the RS (2, 2) encoding matrix, calculates an inverse matrix of each second-order submatrix to obtain a decoding matrix, and stores each decoding matrix into the RNIC, where information indicated by a number 55 in FIG. 5 is each decoding matrix.

After performing erasure code encoding on the original data based on the RS (2, 2) encoding matrix 54, the RNIC writes, into the storage location based on the storage location that is of the target data block indicated by the metadata and that is in the storage node cluster, target data blocks respectively corresponding to K1, K2, P1, and P2. The target data blocks corresponding to K1 and K2 are original data blocks, and the target data blocks corresponding to P1 and P2 are check data blocks.

When any three target data blocks in the target data blocks corresponding to K1, K2, P1, and P2 are successfully written, it is considered that the write operation succeeds. The client may continue to poll a quantity of write success instructions until the quantity of write success instructions is 4, and determine that the fourth target data block is also successfully written into the storage node cluster.

When reading the target data blocks, the client first checks the memory cache to obtain metadata corresponding to the target data blocks, and sends, based on the storage location that is of the target data blocks and that is indicated by the metadata and that is in the storage node cluster, a read request for any three target data blocks in the target data blocks corresponding to K1, K2, P1, and P2 from the storage location. For example, the any three target data blocks are target data blocks respectively corresponding to K1, K2, and P1. It is assumed that the RNIC reads the target data block corresponding to K2 slowly due to a memory access peak of the storage node corresponding to K2. In this case, the RNIC first reads the target data blocks corresponding to K1 and P1, calculates K2 based on the target data block corresponding to K1, the target data block corresponding to P1, and the decoding matrix corresponding to K1 and P1, to obtain original data, and stores the original data into the memory cache.

Figure 6:
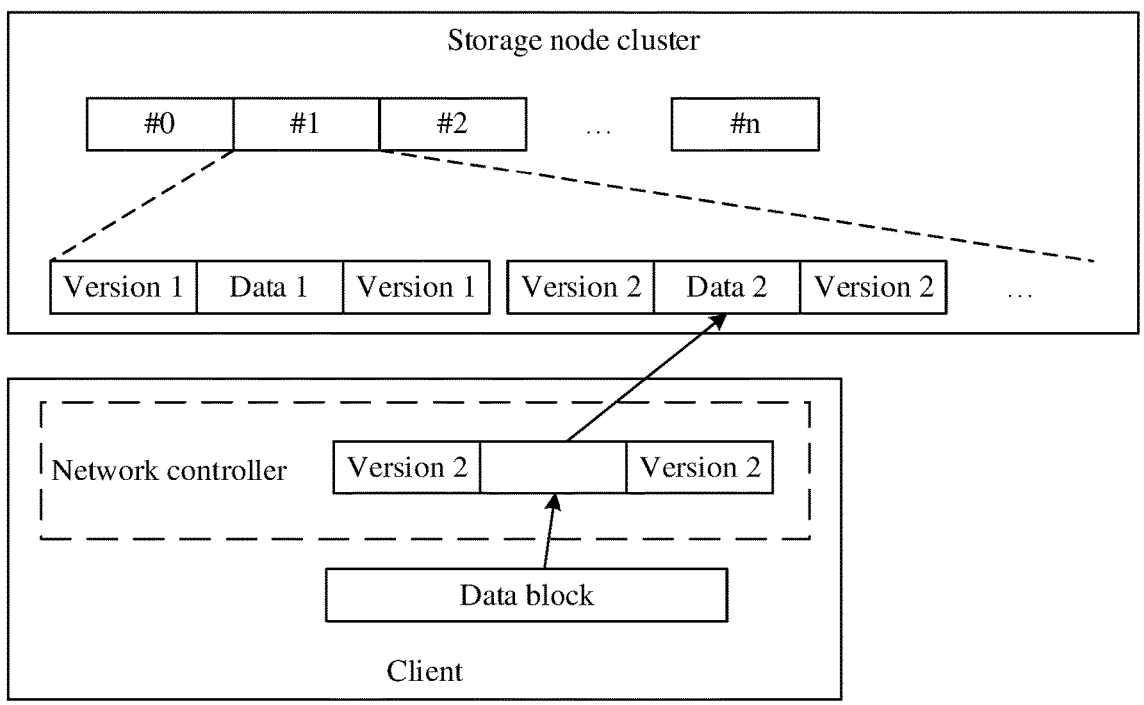
FIG. 6 is a schematic diagram of data transmission according to an embodiment of this application.

Next, FIG. 6 is a schematic diagram of data transmission according to an embodiment of this application. A storage node cluster divides NVRAM space for storing target data blocks into several segments, denoted as "#0", "#1", "#2", . . . , and "#n". Each segment includes several data blocks, each data block includes a version at the head, a version at the tail, and data between the two versions. For example, FIG. 6 shows that the segment "#1" includes at least two data blocks, where one data block includes a version 1 at the head, a version 1 at the tail, and data 1 between the two versions 1; and the other data block includes a version 2 at the head, a version 2 at the tail, and data 2 between the two versions 2.

In this embodiment of this application, each data block in the storage node cluster includes write lock information, a version at the head, a version at the tail, and data between the two versions. The data block has a total of 64 bytes, where the write lock information, the version at the head, and the version at the tail occupy 16 bytes in total. The 16 bytes are divided into eight bytes at the head of the data block and eight bytes at the tail of the data block, and the remaining 48 bytes are bytes occupied by the data.

The client sends original data to the network controller, and the network controller segments the original data, to obtain the original data obtained through segmentation. For each piece of original data obtained through segmentation, the client prepares a storage area that has versions corresponding to the original data obtained through segmentation at two ends, and the network controller writes the original data obtained through segmentation into an area that is in the storage area and that is between the two versions. After performing erasure code encoding processing on the original data, the network controller obtains each piece of check data. For each piece of check data, the client prepares a storage area that has versions corresponding to the check data at two ends, and the network controller writes the check data into an area that is in the storage area and that is between the two versions. For each storage area, the network controller writes all information about the storage area into a data block in the storage node cluster.

Figure 7:
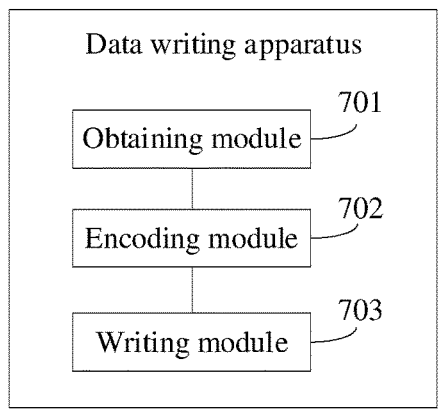
FIG. 7 is a schematic diagram of a structure of a data writing apparatus according to an embodiment of this application.

An embodiment of this application further provides a data writing apparatus. FIG. 7 is a schematic diagram of a structure of a data writing apparatus according to an embodiment of this application. The data writing apparatus is used in a network controller. It should be understood that the data writing apparatus may include more additional modules than the shown modules or omit some of the shown modules. This is not limited in embodiments of this application. As shown in FIG. 7, the data writing apparatus includes: an obtaining module 701, configured to obtain to-be-written original data; an encoding module 702, configured to perform erasure code encoding on the original data, to obtain a plurality of target data blocks; and a writing module 703, configured to write a third quantity of target data blocks in the plurality of target data blocks into a storage node, where the plurality of target data blocks include a first quantity of original data blocks and a second quantity of check data blocks, two ends of the target data block include same version information, and the third quantity is greater than the first quantity.

In a possible implementation, the data writing apparatus further includes: a generation module, configured to generate a write success instruction when a first data block is successfully written into the storage node, where the write success instruction is used by a central processing unit of a first client to determine a write result of the first data block, and the first data block is any target data block in the plurality of target data blocks.

In a possible implementation, the encoding module 702 is configured to obtain the first quantity of original data blocks based on the original data and version information corresponding to the original data, where two ends of the original data block respectively include the version information corresponding to the original data; perform erasure code encoding on the original data, to obtain check data; and obtain the second quantity of check data blocks based on the check data and version information corresponding to the check data, where two ends of the check data block respectively include the version information corresponding to the check data.

In a possible implementation, the first client has a write lock permission, the write lock permission is a permission to write a target data block into the storage node, and the obtaining module 701 is configured to obtain the to-be-written original data sent by another client, where the another client is a client that does not have the write lock permission.

In a possible implementation, the encoding module 702 is configured to: receive an encoding instruction that is for the original data and sent by the central processing unit of the first client; and perform erasure code encoding on the original data in response to the encoding instruction, to obtain the plurality of target data blocks.

Figure 8:
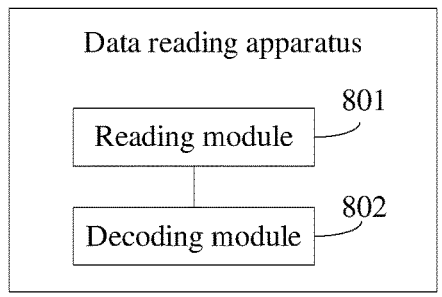
FIG. 8 is a schematic diagram of a structure of a data reading apparatus according to an embodiment of this application.

An embodiment of this application further provides a data reading apparatus. FIG. 8 is a schematic diagram of a structure of a data reading apparatus according to an embodiment of this application. The data reading apparatus is used in a network controller. It should be understood that the data reading apparatus may include more additional modules than the shown modules or omit some of the shown modules. This is not limited in embodiments of this application. As shown in FIG. 8, the data reading apparatus includes: a reading module 801, configured to read a first quantity of target data blocks from a storage node, where the storage node stores a third quantity of target data blocks in a plurality of target data blocks, the plurality of target data blocks include a first quantity of original data blocks and a second quantity of check data blocks, two ends of the target data block include same version information, and the third quantity is greater than the first quantity; and a decoding module 802, configured to perform erasure code decoding on the first quantity of target data blocks, to obtain original data.

In a possible implementation, the reading module 801 is configured to: send a read instruction for a fourth quantity of target data blocks in the third quantity of target data blocks to the storage node, where the fourth quantity is greater than the first quantity, and the fourth quantity is less than or equal to the third quantity; and receive the first first quantity of target data blocks in the fourth quantity of target data blocks.

In a possible implementation, the reading module 801 is configured to: read, in response to that version information of a second data block is stored in a cache area of a second client, the second data block from the cache area, where the cache area stores a target data block that is historically read by the network controller from the storage node, and the second data block is any target data block in the first quantity of target data blocks; and read, in response to that the version information of the second data block is not stored in the cache area, the second data block from the storage node.

In a possible implementation, the data reading apparatus further includes: a storage module, configured to store the original data and the first quantity of target data blocks into the cache area.

In a possible implementation, the decoding module 802 is configured to: obtain a decoding instruction that is based on decoding information and sent by a central processing unit of the second client; and perform, in response to the decoding instruction, erasure code decoding on the first quantity of target data blocks based on the decoding information, to obtain the original data.

It should be understood that, when the network controller provided in FIG. 7 or FIG. 8 implements functions of the apparatus, division into the foregoing functional modules is merely used as an example for description. During actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same concept. For an optional implementation process of the apparatuses, refer to the method embodiments. Details are not described herein again.

The following describes in detail RDMA described above. In embodiments of this application, RDMA is a technology for accessing data in a memory of a remote host without using an operating system kernel. Because the operating system is not used, not only a large quantity of CPU resources are saved, but also a system throughput is improved, and a network communication delay of the system is reduced. RDMA is especially suitable for wide application in a large-scale parallel computer cluster.

RDMA has the following characteristics: (1) Data is transmitted between a network and a remote machine. (2) Without the participation of the operating system kernel, all content related to transmission is offloaded to an intelligent network interface card. (3) Data is directly transmitted between a user space virtual memory and the intelligent network interface card without involving the operating system kernel, and no extra data is moved or copied.

Currently, there are three types of RDMA networks: Infiniband, (RDMA over converged ethernet, RoCE), and (internet wide area RDMA protocol, iWARP). Infiniband is a network specially designed for RDMA. To ensure reliable transmission in terms of hardware, network adapters and switches that support this technology are required. RoCE and iWARP are both Ethernet-based RDMA technologies, and only need to be equipped with special network adapters. In terms of performance, the InfiniBand has the best network, but the price of network adapters and switches is high. RoCE and iWARP require only special network adapters, and the price is much lower.

Figure 9:
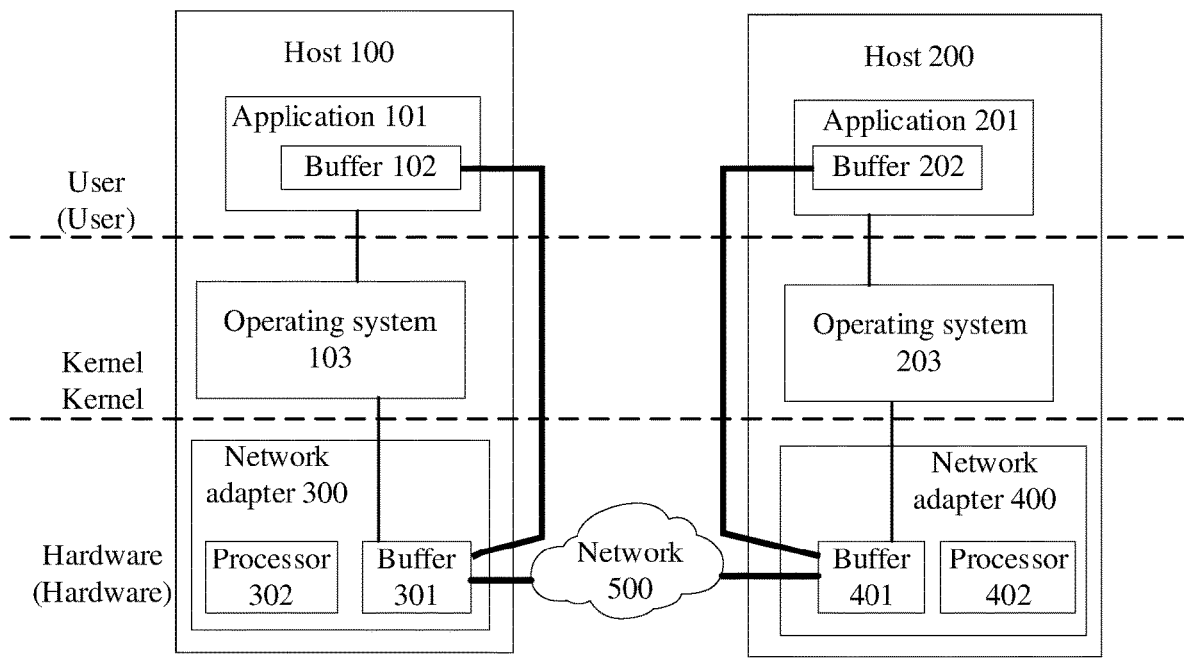
FIG. 9 is a schematic diagram of an architecture of RDMA according to an embodiment of this application.

FIG. 9 is a schematic diagram of an architecture of RDMA according to an embodiment of this application. Taking execution of an RDMA write request message as an example, the working process is as follows: (1) When an application 101 in a host 100 executes the RDMA write request message, a local network adapter 300 reads the request message from a buffer (Buffer) 102 into the buffer 301 of the network adapter 300. In this process, an operating system (OS) 103 is bypassed. The RDMA write request message includes a virtual address, a memory key, and to-be-written data. The virtual address is an address of virtual storage space that can be accessed by the local network adapter 300, and the virtual storage space is obtained by mapping a memory of a host 200. The memory key is used to determine an access permission of the network adapter 300 for the memory of the host 200. (2) A processor 302 of the network adapter 300 sends the RDMA write request to a network adapter 400 through a network 500. (3) The network adapter 400 confirms the memory key, and writes the data into the memory of the host 200. A structure of the host 200 is symmetric to a structure of the host 100, and a process of processing the RDMA read/write request by the host 200 is also consistent with that of the host 100. An internal structure of the host 200 is not described herein in detail.

Figure 10:
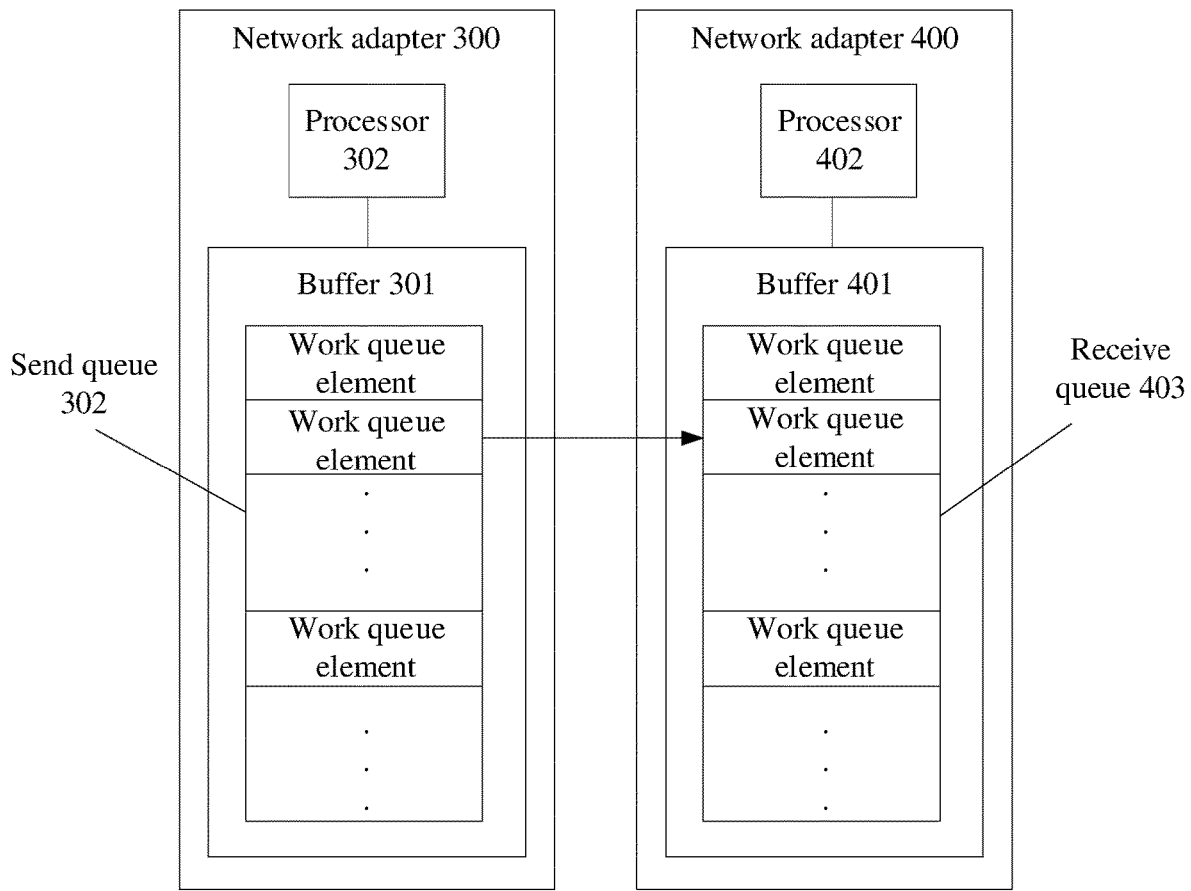
FIG. 10 is a schematic diagram of a queue pair according to an embodiment of this application.

A message service is established on a Channel-IO connection created between local and remote applications of two communicating parties. When an application needs to communicate, a Channel connection is created. First and last endpoints of each Channel are two queue pairs (QP). Each QP is formed by a send queue (SQ) and a receive queue (RQ). FIG. 10 is a schematic diagram of a queue pair according to an embodiment of this application. The queues manage various types of messages. The QP is mapped to virtual address space of the application so that the application can directly access the network adapter through the QP. In addition to the two basic queues described in the QP, the RDMA further provides a complete queue (CQ). The CQ is used to notify a user that messages on a WQ have been processed.

The RDMA further provides a set of software transport interfaces for the user to create a work request (WR). The WR describes message content that the application wants to transmit to a peer end. The WR is notified to a specific queue (work queue, WQ) in the QP. In the WQ, the WR of the user is converted into a format of work queue element (WQE), waits for scheduling and parsing of the network adapter, and obtains the message from a buffer pointed by the WQE and sends the message to the remote host.

The transmission mode of RDMA has a bilateral operation and a unilateral operation. SEND/RECEIVE is a bilateral operation, that is, the remote application needs to sense and participate in the sending and receiving. READ and WRITE are unilateral operations. The local end only needs to specify source and destination addresses of information. The remote application does not need to sense the communication. Data is read or stored through the remote network adapter. The remote network adapter then encapsulates the data into a message and returns the message to the local end. In practice, SEND/RECEIVE is mainly used for connection control packets, and data packets are mainly processed through READ/WRITE.

Figure 11:
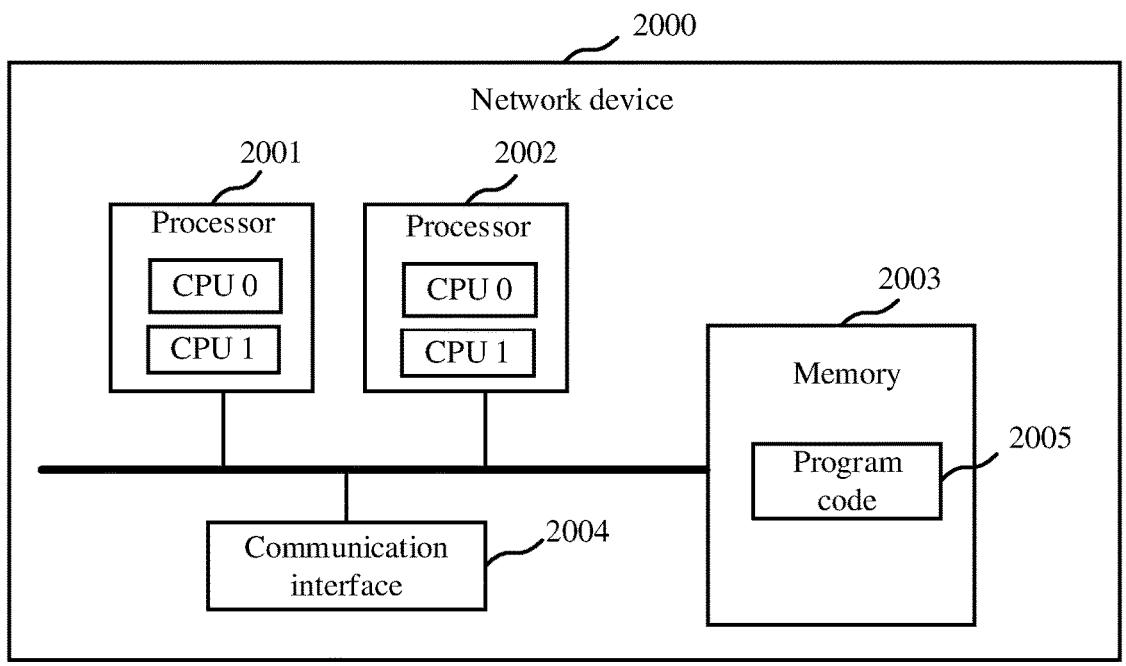
FIG. 11 is a schematic diagram of a structure of a network device according to an embodiment of this application.

FIG. 11 is a schematic diagram of a structure of a network device 2000 according to an example embodiment of this application. The network device 2000 shown in FIG. 11 is configured to perform operations related to the data writing method shown in FIG. 2 and the data reading method shown in FIG. 3. The network device 2000 is, for example, a switch or a router.

As shown in FIG. 11, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present disclosure. Alternatively, the processor may be a combination of processors implementing a computing function, for example, including a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 11, but this does not mean that there is only one bus or only one type of bus. In FIG. 11, in addition to being connected by a bus, components of the network device 2000 may be connected in another manner. The connection manner of the components is not limited in embodiments of the present disclosure.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 is configured to communicate with another device or a communication network by using any transceiver-type apparatus. The communication network may be the ethernet, a radio access network (RAN), a wireless local area network (WLAN), or the like. The communication interface 2004 may include a wired communication interface, and may further include a wireless communication interface. Optionally, the communication interface 2004 may be an Ethernet (ethernet) interface, a Fast Ethernet (FE) interface, a Gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

In an optional implementation, in an embodiment, the processor 2001 may include one or more CPUs, for example, a CPU 0 and a CPU 1 shown in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

In an optional implementation, in an embodiment, the network device 2000 may include a plurality of processors, for example, a processor 2001 and a processor 2002 shown in FIG. 11. Each of the processors may be a single-core processor (single-CPU), or may be a multi-core processor (multi-CPU). The processor herein may be one or more devices, circuits, and/or processing cores configured to process data (for example, computer program instructions).

In an optional implementation, in an embodiment, the network device 2000 may further include an output device and an input device. The output device communicates with the processor 2001, and may display information in a plurality of manners. For example, the output device may be a liquid crystal display (LCD), a light-emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2005 for executing the solutions of this application, and the processor 2001 may execute the program code 2005 stored in the memory 2003. In other words, the network device 2000 can implement, by using the processor 2001 and the program code 2005 in the memory 2003, the data writing method or the data processing method provided in the method embodiments. The program code 2005 may include one or more software modules. Optionally, the processor 2001 may also store program code or instructions for performing the solutions of this application.

In an optional embodiment, the network device 2000 in this embodiment of this application may correspond to the network controller of the first client in the foregoing data writing method embodiments. The processor 2001 in the network device 2000 reads the program code 2005 in the memory 2003 or the program code or the instruction stored in the processor 2001, so that the network device 2000 shown in FIG. 11 can perform all or some operations performed by the network controller of the first client.

In an optional embodiment, the network device 2000 in this embodiment of this application may correspond to the network controller of the second client in the foregoing data reading method embodiments. The processor 2001 in the network device 2000 reads the program code 2005 in the memory 2003 or the program code or the instruction stored in the processor 2001, so that the network device 2000 shown in FIG. 11 can perform all or some operations performed by the network controller of the second client.

The network device 2000 may further correspond to the data writing apparatus shown in FIG. 7, and each functional module in the data writing apparatus is implemented by using software of the network device 2000. In other words, the functional modules included in the data writing apparatus are generated after the processor 2001 of the network device 2000 reads the program code 2005 stored in the memory 2003.

The network device 2000 may further correspond to the data reading apparatus shown in FIG. 8, and each functional module in the data reading apparatus is implemented by using software of the network device 2000. In other words, the functional modules included in the data reading apparatus are generated after the processor 2001 of the network device 2000 reads the program code 2005 stored in the memory 2003.

The steps of the data processing method shown in FIG. 2 to FIG. 6 are completed by using a hardware integrated logic circuit or instructions in the form of software in the processor of the network device 2000. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the steps in the foregoing method in combination with the hardware in the processor. To avoid repetition, details are not described herein again.

Figure 12:
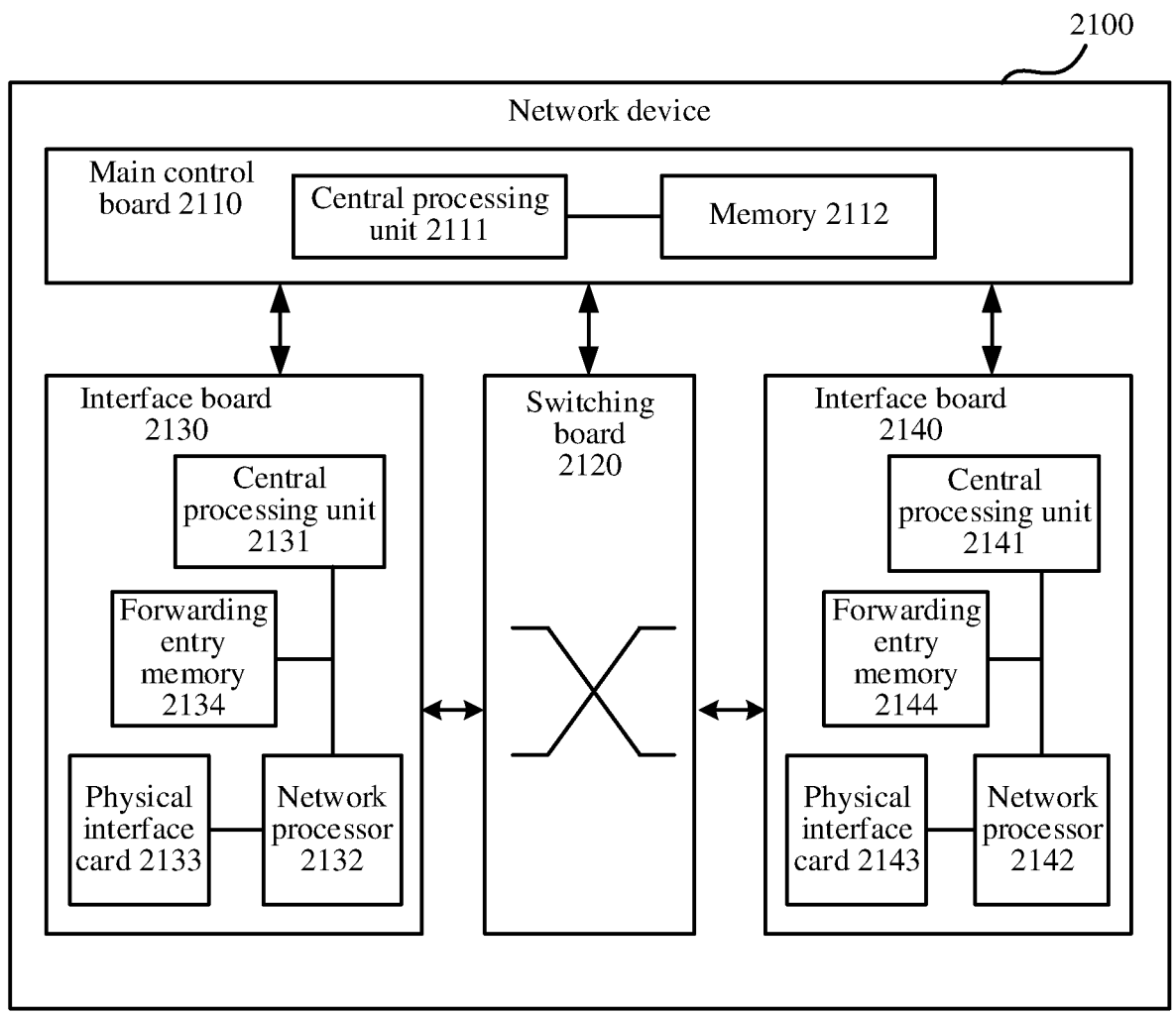
FIG. 12 is a schematic diagram of a structure of a network device according to an embodiment of this application.

FIG. 12 is a schematic diagram of a structure of a network device 2100 according to another example embodiment of this application. The network device 2100 shown in FIG. 12 is configured to perform all or some of the operations in the data processing method shown in FIG. 2 to FIG. 6. The network device 2100 is, for example, a switch or a router, and the network device 2100 may be implemented by using a general bus architecture.

As shown in FIG. 12, the network device 2100 includes a main control board 2110 and an interface board 2130.

The main control board is also referred to as a main processing unit (MPU) or a route processor card. The main control board 2110 is configured to control and manage components in the network device 2100, including route computation, device management, device maintenance, and a protocol processing function. The main control board 2110 includes: a central processing unit 2111 and a memory 2112.

The interface board 2130 is also referred to as a line processing unit (LPU), a line card, or a service board. The interface board 2130 is configured to provide various service interfaces, and forward a data packet. The service interfaces include but are not limited to an Ethernet interface, a packet over SONET/SDH (POS) interface, and the like. The Ethernet interface is, for example, a flexible Ethernet service interface (FlexE Clients). The interface board 2130 includes: a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Optionally, the network processor 2132 is configured to forward a received message based on a forwarding table stored in the forwarding entry memory 2134. If a destination address of the message is an address of the network device 2100, the network processor 2132 sends the message to a CPU (for example, the central processing unit 2131) for processing. If a destination address of the message is not an address of the network device 2100, the network processor 2132 searches for, based on the destination address, a next hop and an outbound interface corresponding to the destination address in the forwarding table, and forwards the message to the outbound interface corresponding to the destination address. Processing on an uplink packet may include: processing at a packet ingress interface and forwarding table lookup, and processing on a downlink packet may include: forwarding table lookup and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

Optionally, the network device 2100 includes a plurality of interface boards. For example, the network device 2100 further includes an interface board 2140, and the interface board 2140 includes: a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard by using a system bus for interworking. In a possible implementation, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a network device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of network device (for example, a network device such as a low-end switch or a router) has a weak data exchange and processing capability. An optional architecture that is to be used depends on an optional networking deployment scenario. This is not limited herein.

In an optional embodiment, the network device 2100 corresponds to the data writing apparatus shown in FIG. 7. In some embodiments, the obtaining module 701 shown in FIG. 7 is equivalent to the physical interface card 2133 in the network management device 2100, and the encoding module 702 and the writing module 703 are equivalent to the central processing unit 2111 or the network processor 2132 in the network management device 2100.

In an optional embodiment, the network device 2100 corresponds to the data reading apparatus shown in FIG. 8. In some embodiments, the reading module 801 shown in FIG. 8 is equivalent to the physical interface card 2133 in the network management device 2100, and the decoding module 802 is equivalent to the central processing unit 2111 or the network processor 2132 in the network management device 2100.

It should be understood that the processor may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, or the like. The general-purpose processor may be a microprocessor or any conventional processor. It is to be noted that the processor may be a processor that supports an advanced reduced instruction set computing machine (advanced RISC machine, ARM) architecture.

Further, in an optional embodiment, the memory may include a read-only memory and a random access memory, and provide instructions and data for the processor. The memory may further include a nonvolatile random access memory. For example, the memory may further store information of a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A computer-readable storage medium is further provided. The storage medium stores at least one program instruction or code. When the program instruction or the code is loaded and executed by a processor, a computer is enabled to implement the data writing method in any of FIG. 2 and FIG. 4 to FIG. 6 or the data reading method in any of FIG. 3 and FIG. 4 to FIG. 6.

This application provides a computer program. When the computer program is executed by a computer, a processor or the computer is enabled to perform corresponding steps and/or procedures in the foregoing method embodiments.

A chip is provided. The chip includes a processor, configured to invoke, from a memory, instructions stored in the memory and run the instructions, to enable a communication device on which the chip is installed to perform the methods in the foregoing aspects.

Another chip is provided. The chip includes: an input interface, an output interface, a processor, and a memory. The input interface, the output interface, the processor, and the memory are connected to each other through an internal connection path. The processor is configured to execute code in the memory. When the code is executed, the processor is configured to perform the methods in the foregoing aspects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive solid state drive), or the like.

The objectives, technical solutions, and beneficial effects of this application are further described in detail in the foregoing optional implementations. It should be understood that the foregoing descriptions are merely optional implementations of this application, but are not intended to limit the protection scope of this application. Any modification, equivalent replacement, or improvement made based on the technical solutions of this application shall fall within the protection scope of this application.

A person of ordinary skill in the art may be aware that, with reference to the embodiments disclosed in this specification, the method steps and the modules can be implemented by using software, hardware, firmware, or any combination thereof. To describe the interchangeability between the hardware and the software, the steps and composition of each embodiment have generally been described above based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

When software is used to implement the embodiments, all or a part of the embodiments may be implemented in a form of a computer program product. The computer program product includes one or more computer program instructions. For example, the method in embodiments of this application may be described in a context of a machine-executable instruction. The machine-executable instruction is included in, for example, a program module executed in a device on a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instruction for the program module may be executed locally or within a distributed device. In the distributed device, the program module may be located in both a local storage medium and a remote storage medium.

Computer program code used to implement the method in embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this application, the computer program code or related data may be carried by any appropriate carrier, so that a device, an apparatus, or a processor can perform various processing and operations described above. For example, the carrier includes a signal, a computer-readable medium, and the like.

For example, the signal may include propagating signals in electrical, optical, radio, sound, or other forms, such as carrier waves and infrared signals.

The machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

It may be understood by a person skilled in the art that, for the purpose of convenient and brief description, for an optional working process of the foregoing system, device, and module, refer to a corresponding process in the foregoing method embodiment. Details are not described herein.

In the several embodiments provided in this application, it should be understood that the disclosed system, device, and method may be implemented in other manners. For example, the described device embodiment is merely an example. For example, the module division is merely logical function division and may be other division during actual implementation. For example, a plurality of modules or components may be combined or integrated into another system, or some features may be omitted or not performed. In addition, the displayed or discussed mutual couplings or direct couplings or communication connections may be implemented through some interfaces, and the indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions to cause a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms "first", "second", and the like are used to distinguish between same or similar items whose effects and functions are basically the same. It should be understood that there is no logical or time-sequence dependency among "first", "second", and "nth", and a quantity and an execution sequence are not limited. It should also be understood that although the terms such as "first" and "second" are used in the following description to describe various elements, these elements should not be limited by the terms. These terms are merely used to distinguish one element from another element. For example, without departing from the scope of the various examples, a first client may be referred to as a second client, and similarly, a second client may be referred to as a first client. Both the first client and the second client may be clients, and in some cases, may be separate and different clients.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more. In this application, the term "a plurality of" means two or more. For example, a plurality of target data blocks means two or more target data blocks. The terms "system" and "network" may be used interchangeably in this specification.

It should be understood that the terms used in the descriptions of various examples in this specification are merely intended to describe exemplary examples, but are not intended to constitute a limitation. The terms "one" ("a" and "an") and "the" of singular forms used in the descriptions of various examples and the appended claims are also intended to include plural forms, unless otherwise specified in the context.

It should be further understood that the term "include" (or "includes", "including", "comprises", and/or "comprising"), when being used in this specification, specifies the presence of stated features, integers, steps, operations, elements, and/or components, but does not preclude the presence or addition of one or more other features, integers, steps, operations, elements, components, and/or groups thereof.

It should be further understood that the term "if" may be interpreted as a meaning "when" ("upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined only based on A, but B may be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

What is claimed is:

1. A data writing method, wherein the method comprises:
   obtaining, by a network controller of a first client, to-be-written original data;
   performing, by the network controller, erasure code encoding on the original data, to obtain a plurality of target data blocks; and
   writing, by the network controller, a third quantity of target data blocks of the plurality of target data blocks into a storage node, wherein the plurality of target data blocks comprise a first quantity of original data blocks and a second quantity of check data blocks, two ends of a target data block comprise same version information, and the third quantity is greater than the first quantity.

2. The method according to claim 1, wherein the method further comprises:
   generating, by the network controller, a write success instruction when a first data block is successfully written into the storage node, wherein the write success instruction is used by a processor of the first client to determine a write result of the first data block, and the first data block is any target data block of the plurality of target data blocks.

3. The method according to claim 1, wherein the performing, by the network controller, the erasure code encoding on the original data, to obtain the plurality of target data blocks comprises:
   obtaining, by the network controller, the first quantity of the original data blocks based on the original data and version information corresponding to the original data, wherein two ends of a original data block respectively comprise the version information corresponding to the original data;
   performing, by the network controller, the erasure code encoding on the original data, to obtain check data; and
   obtaining, by the network controller, the second quantity of the check data blocks based on the check data and version information corresponding to the check data, wherein two ends of a check data block respectively comprise the version information corresponding to the check data.

4. The method according to claim 1, wherein the first client has a write lock permission, the write lock permission is a permission to write a target data block into the storage node, and the obtaining, by the network controller of the first client, the to-be-written original data comprises:
   obtaining, by the network controller, the to-be-written original data sent by another client, wherein the other client is a client that does not have the write lock permission.

5. The method according to claim 1, wherein the performing, by the network controller, the erasure code encoding on the original data, to obtain the plurality of target data blocks comprises:
   receiving, by the network controller, an encoding instruction that is for the original data and sent by a processor of the first client; and
   performing, by the network controller, the erasure code encoding on the original data in response to the encoding instruction, to obtain the plurality of target data blocks.

6. A data reading method, wherein the method comprises:
   reading, by a network controller of a second client, a first quantity of target data blocks from a storage node, wherein the storage node stores a third quantity of target data blocks of a plurality of target data blocks, the plurality of target data blocks comprise the first quantity of original data blocks and a second quantity of check data blocks, two ends of a target data block comprise same version information, and the third quantity is greater than the first quantity; and
   performing, by the network controller, erasure code decoding on the first quantity of the target data blocks, to obtain original data.

7. The method according to claim 6, wherein the reading, by the network controller of the second client, the first quantity of the target data blocks from the storage node comprises:
   sending, by the network controller, a read instruction for a fourth quantity of target data blocks of the third quantity of the target data blocks to the storage node, wherein the fourth quantity is greater than the first quantity, and the fourth quantity is less than or equal to the third quantity; and receiving, by the network controller, the first quantity of target data blocks of the fourth quantity of the target data blocks.

8. The method according to claim 6, wherein the reading, by the network controller of the second client, the first quantity of the target data blocks from the storage node comprises:

reading, by the network controller in response to that version information of a second data block is stored in a cache area of the second client, the second data block from the cache area, wherein the cache area stores a target data block that is historically read by the network controller from the storage node, and the second data block is any target data block of the first quantity of the target data blocks; and reading, by the network controller in response to that the version information of the second data block is not stored in the cache area, the second data block from the storage node.

9. The method according to claim 6, wherein the method further comprises:

storing, by the network controller, the original data and the first quantity of the target data blocks into a cache area of the second client.

10. The method according to claim 6, wherein the performing, by the network controller, the erasure code decoding on the first quantity of the target data blocks, to obtain the original data comprises:

obtaining, by the network controller, a decoding instruction that is based on decoding information and sent by a processor of the second client; and performing, by the network controller in response to the decoding instruction, the erasure code decoding on the first quantity of the target data blocks based on the decoding information, to obtain the original data.

11. A data writing apparatus, wherein the data writing apparatus is used in a network controller of a first client, and the apparatus comprises:

a receiver, configured to obtain to-be-written original data;

an encoder, configured to perform erasure code encoding on the original data, to obtain a plurality of target data blocks; and a writer, configured to write a third quantity of target data blocks of the plurality of target data blocks into a storage node, wherein the plurality of target data blocks comprise a first quantity of original data blocks and a second quantity of check data blocks, two ends of a target data block comprise same version information, and the third quantity is greater than the first quantity.

12. The apparatus according to claim 11, wherein the apparatus further comprises:

a generator, configured to generate a write success instruction when a first data block is successfully written into the storage node, wherein the write success instruction is used by a processor of the first client to determine a write result of the first data block, and the first data block is any target data block of the plurality of target data blocks.

13. The apparatus according to claim 11, wherein the encoder is configured to obtain the first quantity of the original data blocks based on the original data and version information corresponding to the original data, wherein two ends of a original data block respectively comprise the version information corresponding to the original data; perform the erasure code encoding on the original data, to obtain check data; and obtain the second quantity of the check data blocks based on the check data and version information corresponding to the check data, wherein two ends of a check data block respectively comprise the version information corresponding to the check data.

14. The apparatus according to claim 11, wherein the first client has a write lock permission, the write lock permission is a permission to write a target data block into the storage node, and the receiver is configured to obtain the to-be-written original data sent by another client, wherein the another client is a client that does not have the write lock permission.

15. The apparatus according to claim 11, wherein the encoder is configured to: receive an encoding instruction that is for the original data and sent by a processor of the first client; and perform the erasure code encoding on the original data in response to the encoding instruction, to obtain the plurality of target data blocks.

16. A data reading apparatus, wherein the data reading apparatus is used in a network controller of a second client, and the apparatus comprises:

a reader, configured to read a first quantity of target data blocks from a storage node, wherein the storage node stores a third quantity of target data blocks of a plurality of target data blocks, the plurality of target data blocks comprise the first quantity of original data blocks and a second quantity of check data blocks, two ends of a target data block comprise same version information, and the third quantity is greater than the first quantity; and a decoder, configured to perform erasure code decoding on the first quantity of the target data blocks, to obtain original data.

17. The apparatus according to claim 16, wherein the reader is configured to: send a read instruction for a fourth quantity of target data blocks of the third quantity of the target data blocks to the storage node, wherein the fourth quantity is greater than the first quantity, and the fourth quantity is less than or equal to the third quantity; and receive the first quantity of target data blocks of the fourth quantity of the target data blocks.

18. The apparatus according to claim 16, wherein the reader is configured to: read, in response to that version information of a second data block is stored in a cache area of the second client, the second data block from the cache area, wherein the cache area stores a target data block that is historically read by the network controller from the storage node, and the second data block is any target data block of the first quantity of the target data blocks; and read, in response to that the version information of the second data block is not stored in the cache area, the second data block from the storage node.

19. The apparatus according to claim 16, wherein the apparatus further comprises:

a memory, configured to store the original data and the first quantity of the target data blocks into a cache area of the second client.

20. The apparatus according to claim 16, wherein the decoder is configured to: obtain a decoding instruction that is based on decoding information and sent by a processor of the second client; and perform, in response to the decoding instruction, the erasure code decoding on the first quantity of the target data blocks based on the decoding information, to obtain the original data.

* * * * *